(No Model.)

J. PAULUS.
FAUCET OR TAP.

No. 563,307. Patented July 7, 1896.

WITNESSES:
John Buckler,
L. M. Muller.

INVENTOR
Jacob Paulus,
BY Edgar Tate & Co
ATTORNEYS

UNITED STATES PATENT OFFICE.

JACOB PAULUS, OF BROOKLYN, NEW YORK.

FAUCET OR TAP.

SPECIFICATION forming part of Letters Patent No. 563,307, dated July 7, 1896.

Application filed July 19, 1895. Serial No. 556,449. (No model.)

*To all whom it may concern:*

Be it known that I, JACOB PAULUS, a citizen of the United States, and a resident of Brooklyn, county of Kings, and State of New York, have invented certain new and useful Improvements in Faucets or Taps, of which the following is a specification, reference being had to the accompanying drawings, forming a part thereof, in which similar letters of reference indicate corresponding parts in all the figures.

This invention relates to faucets or taps of that class which are usually employed in connection with casks or barrels containing beer, ale, or other fermented or distilled liquors, and the object thereof is to provide a faucet adapted for use in connection with a peculiarly-constructed bushing, having a combination rotating valve which is operated by a faucet plug or key adapted to be connected with or removed from the bushing whenever desired; and with this and other objects in view the invention consists in the construction, combination, and arrangement of parts hereinafter described and claimed.

The invention is fully disclosed in the following specification, of which the accompanying drawings form a part, and in which—

Figure 1:
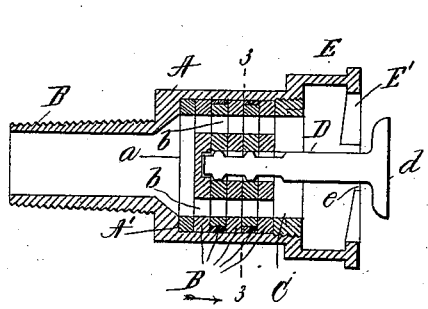
Figure 2:
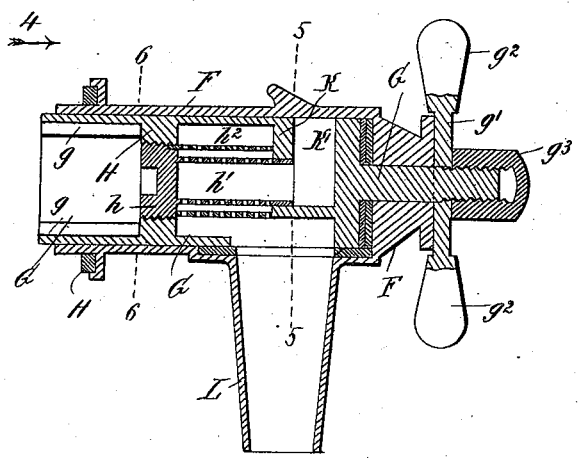
Figure 3:
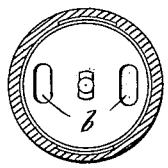
Figure 4:
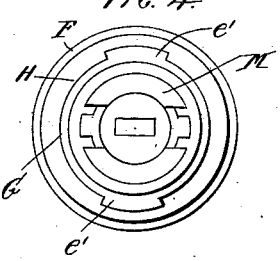
Figure 5:
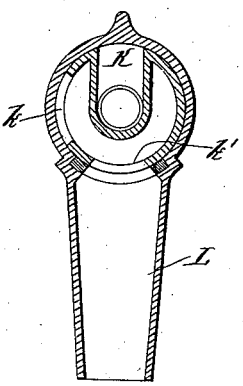
Figure 6:
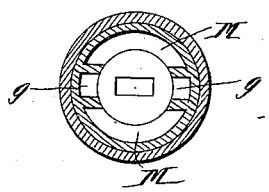

Figure 1 is a central longitudinal section of my improved bushing provided with a combination rotating valve; Fig. 2, a similar view of the faucet-plug and its connected devices; Fig. 3, a section on the line 3 3 of Fig. 1; Fig. 4, an end view of the inner end of the faucet-plug, taken in the direction of the arrow 4; Fig. 5, a section on the line 5 5 of Fig. 2, and Fig. 6 a section on the line 6 6 of Fig. 2.

In the practice of my invention, I employ a bushing A, provided with a tubular screw-threaded extension B, adapted to be secured to the bung of a barrel or to a pipe, and if desired the body of the bushing itself may be secured within the bung-hole of a cask in the usual manner and as will be readily understood. The bushing A is provided at its inner end with an annular inwardly-directed ledge or shoulder A', on which is placed a packing-ring $a$ of any desired material, and arranged adjacent to the packing-ring $a$ are a series of plates or disks B', five in number, the second and fourth of which are revoluble, and the first, third, and fifth of which are fixed and immovable, and these plates or disks are held in place by an annular band C.

Each of the plates or disks B' is provided with side ports or openings, as shown at $b$, which are adapted to register when desired, and the four outer plates are each provided with central slots or openings $b'$, as shown in Fig. 3, through which passes the shank of a key D, which is provided with a head $d$, and the inner end of which is adapted to rest in a recess or cavity formed in the central portion of the inner fixed plate B', and the shank of the key D is provided on opposite sides with projections or shoulders by which the second and fourth plates or disks B' are revolved or may be whenever desired, and in this operation, as will be understood, the first, third, and fifth of said plates remain stationary.

The outer end of the bushing A is provided with an annular enlargement E, on the outer end of which is formed an inwardly-directed flange E', through which at opposite sides are formed slots or openings $e$, adapted to receive shoulders or projections $e'$, formed on the outer faucet-tube F, as shown in Fig. 4, and the inner surfaces of the flange E', adjacent to the openings $e$, are inclined or cam-shaped, and the shoulders or projections $e'$ of the faucet-tube F are also inclined or cam-shaped, so that when the end of the faucet-tube is inserted within the extension E of the bushing A and turned, the shoulders or projections $e'$, operating in connection with the inclined inner surfaces of the flange E', will draw the faucet-tube into and securely lock it in connection with the bushing A, as will be readily understood. In this operation the head $d$ of the key D passes into the inner faucet-tube G, and into longitudinal slots $g$, formed therein, and a packing-ring H serves to make a tight connection between the faucet plug or tube and the end of the bushing A, as will be readily understood.

It will be observed that the inner faucet-tube G is provided at its outer end with an extension or shank G', which passes through a head F' on the outer faucet-tube, and to which is secured a plate $g'$, provided with handles $g^2$, said plate being held in place by a screw-threaded head or cap $g^3$, and the inner faucet-tube G is also provided near its inner end with an annular inwardly-directed shoulder H, in which is secured a screw-threaded plug $h$, with which are connected perforated tubes $h'$ and $h^2$, the inner one of which $h'$ extends through a partition K, which forms a chamber K' in the outer end of the inner faucet-tube, and, as shown in Fig. 2, the outer perforated tube $h^2$ also connects with said partition K', and an annular chamber is formed around said perforated tube $h^2$, and another annular chamber between the perforated tubes $h'$ and $h^2$, and also formed in said inner faucet-tube G are side ports or openings $k$ and $k'$, as shown in Fig. 5, each of which is adapted to communicate with a discharge-tube L when the inner faucet-tube is turned by means of the handles $g^2$.

Formed in the annular inwardly-directed shoulder or projection H of the inner faucet-tube G are side ports or openings M, (shown in Fig. 6,) which communicate with the annular chamber around the perforated tube $h^2$, and with the outer end of the inner faucet-tube, and it will also be observed that the chamber K' in the outer end of the faucet-tube opens outwardly, and is also adapted to communicate with the discharge-tube L of the faucet-tube when the inner faucet-tube is applied.

In operation the bushing is secured to the cask or barrel in any desired manner, and when it is necessary or desirable to discharge the contents or a portion thereof the faucet tube or plug is connected therewith, as hereinbefore described, by inserting the inner end of the tube F into the enlarged extension E of the bushing, in which operation the shoulders or projections $e'$ on the tube F pass through openings $e$ in the flange E', when by turning the tube F the parts will be locked together. In this operation also the head $d$ of the key D' passes into the slots $g$ of the inner faucet-tube G, and by a turn of the inner faucet-tube G by means of the handles $g^2$ the valve-plates B will be operated or turned into such position that the passages $b$ therethrough will register, when the contents of the cask or barrel will flow out through the tube G and the passages M therein into the chamber around the perforated tube $h^2$, and out at the discharge-pipe L.

The ports $k$ and $k'$ are so arranged that when the communication between the inner end of the tube G and the cask or barrel is cut off one of said ports may be in communication with the tube L, and thus allow a free circulation of air through said tube L and the chambers around the perforated tubes $h'$ and $h^2$, and also the chamber K', and the said tube G may also be turned so that the said chamber K' will also communicate with the tube L, as will be readily understood.

The purpose of the perforated tube $h'$ and $h^2$ is to provide a strainer for the contents of the cask or barrel, and also to permit of the free circulation of air therethrough, as will be readily understood, and it will thus be seen that I accomplish the object of my invention by means of a device simple in construction and operation, and which is perfectly adapted to produce the results for which it is intended.

In the foregoing operation, when the faucet is in position and the bushing-valve open, as indicated in Fig. 1, the liquid will flow around the strainers or perforated tubes $h'$ and $h^2$, as herein described, and upon revolving the inner faucet-tube G through one hundred and eighty degrees the orifice K' will register with the nozzle or discharge-tube L, in which position the liquids will flow through the strainers or perforated tubes $h'$ and $h^2$, and the object of the port or opening $k$ in the faucet-tubes G is for allowing a circulation of air through the faucet when the flow is cut off.

It is evident that changes in the form, construction, and combination of the various parts of my invention may be made without departing from its spirit or sacrificing its advantages, and I therefore reserve the right to make such alterations therein as fairly come within the scope of the invention.

Having fully described my invention, I claim and desire to secure by Letters Patent—

1. The combination with a bushing adapted to be connected with a cask, barrel or other vessel, of a combination, rotating valve located therein, adapted to be operated by a key, and means for operating said key consisting of a faucet-tube adapted to be connected with the bushing, and a revoluble faucet-tube located therein, adapted to make connection with the head of the key, said revoluble tube being provided with ports or openings, which communicate with a discharge-tube connected with the outer faucet-tube, and means for operating the revoluble tube, substantially as shown and described.

2. The combination with a bushing, for casks, barrels, or other vessels, provided with a valve, of a key adapted to operate said valve, a faucet-tube adapted to be connected with said bushing, a revoluble tube located within the faucet-tube, open at one end, and provided with longitudinal slots adapted to engage with the head of the key, said revoluble tube being provided with an annular shoulder or projection, a plug for closing the opening through said annular shoulder or projection, and passages through said annular shoulder forming a communication between the inner and outer ends of said tube, and the outer end of said tube being also adapted to be placed in communication with the discharge-tube of the faucet, substantially as shown and described.

3. The combination with a bushing, adapted to be connected with a cask, barrel or other vessel, and provided with an annular combination rotating valve, of a key adapted to operate said valve, a faucet-tube adapted to be connected with the bushing, a revoluble tube within the faucet-tube, the inner end of which is open and the inner walls of which are provided with longitudinal slots adapted to engage with the head of the key, said revoluble tube being provided at its outer end with a chamber, adapted to be placed in communication with the discharge-tube of the faucet, and with annular chambers which are in communication with the inner end of the tube and means for revolving the revoluble tube, substantially as shown and described.

4. The combination with a bushing adapted to be connected with a cask, barrel or other vessel, and provided with a valve, of a key adapted to operate said valve, a faucet-tube adapted to be connected with said bushing, a revoluble tube within the faucet-tube, the inner end of which is open and provided with means for operating the key, a partition within said revoluble tube, having passages therethrough, perforated tubes within the outer end of said revoluble tube forming annular chambers therein, each of which is adapted to be placed in communication with the discharge-tube of the faucet by means of ports or openings in the revoluble tube, said revoluble tube being also provided with an air-discharge passage with which one of said perforated tubes communicates, and said air-discharge passage being also provided with an opening adapted to be placed in communication with the discharge-tube of the faucet, substantially as shown and described.

In testimony that I claim the foregoing as my invention I have signed my name, in presence of two witnesses, this 27th day of June, 1895.

JACOB PAULUS.

Witnesses:
PERCY T. GRIFFITH,
L. M. MULLER.